(12) United States Patent
Becker

(10) Patent No.: US 6,987,585 B1
(45) Date of Patent: Jan. 17, 2006

(54) TRAP SHAPING USING A MITER EQUATION

(75) Inventor: Douglas R. Becker, Ayer, MA (US)

(73) Assignee: Adobe Systems Incorporated, San Jose, CA (US)

( * ) Notice: Subject to any disclaimer, the term of this patent is extended or adjusted under 35 U.S.C. 154(b) by 907 days.

(21) Appl. No.: 09/672,236

(22) Filed: Sep. 27, 2000

(51) Int. Cl.
H04N 1/00 (2006.01)
H04N 1/40 (2006.01)
H04N 1/46 (2006.01)
G06F 15/00 (2006.01)
G06F 1/00 (2006.01)

(52) U.S. Cl. .................. 358/1.9; 358/448; 358/400; 358/500

(58) Field of Classification Search ............. 358/1.9, 358/3.2, 3.24, 500, 515, 517, 518, 525, 526; 382/178, 241; 345/620
See application file for complete search history.

(56) References Cited

U.S. PATENT DOCUMENTS

| 5,295,236 A | * | 3/1994 | Bjorge et al. ............ 715/527 |
| 5,313,570 A | | 5/1994 | Dermer et al. ............ 345/589 |
| 5,402,534 A | * | 3/1995 | Yeomans ................... 345/601 |
| 5,412,877 A | * | 5/1995 | McKendrick ................ 33/567 |
| 5,542,052 A | | 7/1996 | Deutsch et al. ........... 345/589 |
| 5,613,046 A | | 3/1997 | Dermer .................... 358/1.9 |
| 5,668,931 A | | 9/1997 | Dermer .................... 358/1.4 |
| 5,760,779 A | * | 6/1998 | Yamashita et al. ......... 345/421 |
| 5,832,127 A | * | 11/1998 | Healey .................... 382/241 |
| 6,031,544 A | * | 2/2000 | Yhann ..................... 345/620 |
| 6,236,754 B1 | * | 5/2001 | Harrington ................ 382/199 |
| 6,697,078 B2 | | 2/2004 | Becker et al. ............ 345/589 |
| 2004/0212628 A1 | | 10/2004 | Becker et al. ............ 345/620 |

OTHER PUBLICATIONS

"The Complete Guide to Trapping, " (2nd Ed.), Brian P. Lawler, 1995 Hayden Books.

* cited by examiner

Primary Examiner—Thomas D Lee
Assistant Examiner—James A. Thompson
(74) Attorney, Agent, or Firm—Fish & Richardson P.C.

(57) ABSTRACT

A method and apparatus of forming a trap polygon for trapping a color transition edge. The method includes identifying an interfering edge which intersects a keep away zone defined by the color transition edge, calculating a line on which traps the color transition edge and the interfering edge would optimally abut one another and shaping a trap polygon using the line.

26 Claims, 6 Drawing Sheets

TRAP SHAPING USING A MITER EQUATION

BACKGROUND

The invention relates generally to methods and for forming polygons for use in trapping in digital document preparation or prepress operations.

A page in an electronic document may include various types of objects, including text, line art, and images. Electronic documents are generally created by computer programs (also called application programs or simply applications) that may be executed by a user on a computer to create and edit electronics documents and to produce (directly or indirectly) printed output defined by the documents. Such programs include the Adobe illustrator7 and Photoshop7 products, both available from Adobe Systems Incorporated of San Jose, Calif. Objects in electronic documents may be represented in vector form, raster form, or in hybrid forms.

A color page in an electronic document includes information about the colors used in the page. Colors are defined in accordance with a "color space", which provides a data representation of a range of colors in terms of basic color components. The specific color components will vary depending on the color system used. For example, in the CMYK color system, colors are represented as combinations of cyan (C), magenta (M), yellow (Y), and black (or "key") (K).

To create a physical page printed with inks, data representation of colors are used to create color separations. This is general done by computer programs running on general or special purpose systems. Generally, each color separation used by an output device will correspond to a color component of the color system used by the device. For example, data representations of colors in output generated for an imagesetter using a CMYK color system will be used to create color separations for cyan, magenta, yellow, and black, with each separation indicating regions where the corresponding ink should be applied, as well as the amount of ink that should be applied.

Misregistration or inaccuracies in the physical placement of two or more colors with respect to each other on a printed sheet in printing can cause unintentional gaps or overlaps at edges of color regions on an output page. Misregistration may occur for a variety of reasons relating to the performance of people, machines, and materials.

To minimize the effects of misregistration, a technique known as trapping adjusts the shapes of color regions by spreading (expanding) some color regions to prevent gaps, and choking (contracting) other color regions to prevent overlaps. In determining whether an edge of a shape requires a trap, trapping entails evaluating one or more trap conditions, such as a maximum color difference. Trapping also considers a trap width, defining a general distance around an edge where trapping conditions apply. The adjusted areas into which inks will be spread or from which inks will be contracted are referred to as "trap regions" and defined by a trap polygon. Trapping also entails determination of the color of ink to be applied to the trap regions for each affected separation. Thus, each trap region has a trap color defining a color for the trap polygon.

When multiple objects form edges that are in close proximity, a trap polygon generated by conventional trapping operations for one or more of these objects can overlap another trap polygon or an object. This overlap may create undesirable printing effects and the trap polygons may no longer be invisible, defeating the original purpose of the trapping operation.

SUMMARY

The invention provides methods and apparatus implementing a technique for forming a trap polygon, which does not interfere with the print quality of other trap polygons or objects. Edges in close proximity to a color transition edge (CTE) are checked for potential interference. A trap polygon is formed for the CTE that avoids any interfering edges or trap polygons for those edges. The technique can be applied to form a trap polygon for each edge in a page to be printed.

In one aspect, the invention provides a method of forming a trap polygon for trapping a color transition edge, where the trap polygon has an associated trap color determined by colors defining the color transition edge. The method includes identifying an interfering edge which intersects a keep away zone defined by the color transition edge and forming a trap polygon for trapping the color transition edge including shaping the trap polygon to avoid overlapping a trap polygon corresponding to the interfering edge. Shaping the trap polygon includes determining a miter equation that defines a line that is half a distance from the color transition edge and the interfering edge along a length of either edge, determining movement equations for points on the trap polygon that need to move due to the proximity of the interfering edge and shaping the trap polygon including locating each moving point at an intersection of a movement equation and the miter equation.

Aspects of the invention can include one or more of the following features. The trap polygon, the color transition edge and interfering edge can be vector-based representations. The keep away zone can enclose the trap polygon or be within a tile, where the tile includes one or more tile edges and each potentially interfering edge is a tile edge which touches the keep away zone. An interfering edge can have a paper color on one side.

The color transition edge can be defined by two points and defines a transition between a first color and a second color where the first color is on a same side of the color transition edge as an interfering edge and the second color is on an opposite side of the color transition edge from the interfering edge. The interfering edge can have a color on one side which would satisfy a trap condition with the first color. The interfering color and the second color can indicate a hypothetical trap color which is significantly different from the trap color. The hypothetical trap color can differ from the trap color by more than a vignette color transition. The vignette color transition can be approximately 5%. The trap color can have one or more trap colorant planes and the hypothetical trap color can have one or more hypothetical color planes. Any trap colorant plane which would not overprint can differ from a corresponding hypothetical colorant plane by more than the vignette color transition. A colorant plane which would overprint would not be printed when printing an object having a color including that colorant plane.

Forming the trap polygon can include shaping one or more edges of the trap polygon so that the trap polygon abuts without overlapping any abutting trap polygon based upon an interfering edge which intersects the color transition edge. The trap polygon does not overlap any object edge which is within the keep away zone but does not intersect the color transition edge or any close trap polygon based upon an interfering edge which is within the keep away zone but does not intersect the color transition edge. Trimming the trap polygon can include adjusting the trap polygon to avoid one or more interfering edges by adding trimming points to the trap polygon for points on any interfering edges which are in or on the trap polygon and removing points from the trap polygon which are outside the trimming points. The trap polygon can be defined by a plurality of points which are of one or more types. Shaping the trap polygon can include moving one or more points of the trap polygon according to the type of the point.

The miter equation can define a line that splits a distance between the color transition edge and the interfering edge. If the color transition edge and the interfering edge are parallel and share an end point, the step of determining a miter line includes locating the miter line as a line that is perpendicular to the color transition edge and includes the end point. If the color transition edge and the interfering edge are parallel and have end points that are within a predetermined distance, the step of determining a miter line includes locating the miter line as a line that is perpendicular to the color transition edge and includes one of the end points. The predetermined distance can be half a pixel. The movement equations have a direction and a length that is at least half a distance from the color transition edge to the interfering edge. The step of determining movement equations includes in a first coordinate space, determining if a point is between the end points that define the color transition edge, and if so, locating a movement equation that passes through the point and is perpendicular to the color transition edge. If the point is outside the end points, locating a movement equation that passes through the point and a closest end point on the color transition edge. The movement equations can be movement vectors that have a direction and a length. The movement vectors length can be at least half a distance between the color transition edge and the interfering edge along the entire length of both edges.

In another aspect, the invention provides a method of adjusting a trap polygon for trapping an edge in view of an identified interfering edge. The method includes determining a miter equation that is half a distance from the color transition edge and the interfering edge along the length of either edge, determining movement equations for points on the trap polygon that need to move due to the proximity of the interfering edge and shaping the trap polygon including locating each moving point at an intersection of a movement equation and the miter equation.

In another aspect the invention provides a method of forming a trap polygon for trapping a color transition edge. The method includes identifying an interfering edge which intersects a keep away zone defined by the color transition edge, calculating a line on which traps from the color transition edge and the interfering edge would optimally abut one another and shaping a trap polygon using the line.

The invention provides one or more of the following advantages. Overlapping trap polygons are avoided improving print quality. Similarly, trap polygons can be generated that do not overlap other graphical objects in a page. Portions of a trap polygon which do not aid in trapping are removed while shaping the trap portion. Trapping can be performed with large trap widths improving print quality for applications such as printing on a medium other than paper. The invention also provides a smooth transition between abutting trap polygons.

DETAILED DESCRIPTION

Figure 1:
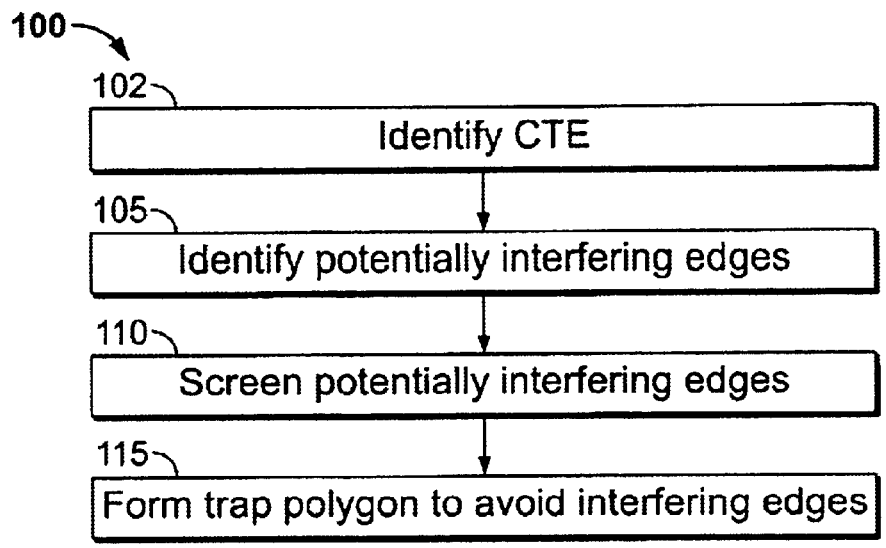
FIG. 1 is a flowchart for forming a trap polygon around a color transition edge according to the invention.

FIG. 1 is a flowchart describing a technique for forming a trap polygon around a color transition edge (CTE). The technique can be executed as a process on a processor, which can be located in a computer system or a printer. The system performs the steps described below to form a definition of the desired trap polygon as a preprocessing step before printing or rendering a page including multiple graphical objects. The process can be applied to each edge in an electronic document.

The system shapes the trap polygon to avoid overlaps with interfering edges and other trap polygons. Edges are the boundaries of graphical objects. The CTE is an edge bisecting two color regions, which presents a risk of misregistration or other printing problem. The CTE and trap polygon are defined in a vector space as points connected by segments. All of the operations of the process can be performed in vector space. Each edge is defined by two points. The trap polygon includes at least three points. Segments of the trap polygon which share an endpoint with the CTE are referred to as of the trap polygon. The remaining segments of the trap polygon are part of either end. The trap polygon also includes an associated trap color that is determined by the colors on either side of the CTE.

The system identifies a trappable edge or CTE (step 102). A CTE is an edge that satisfies a trap condition, such as exceeding a certain color difference between the colors defined on either side of the CTE. The system can use a conventional method to identify CTEs. Thus, the system generates a trap polygon for each CTE satisfying a trap condition and then shapes that trap polygon, as described below. Alternatively, the process can be adapted to shape a trap polygon separately generated by a conventional method. Identifying the CTE includes identifying a trap color for the CTE. The trap color the lighter of the two colors on either side of the CTE into the darker color. For example, if the color on one side of a CTE is 10% cyan, 20% magenta, 30% yellow, and 40% black, and the color on the other side is 40% cyan, 30% magenta, 20% yellow, and 10% black, the trap color is 40% cyan, 30% magenta, 30% yellow, and 40% black.

The system identifies edges, which are potentially interfering edges (step 105). Potentially interfering edges can be color transition edges for different graphical objects or other edges in the same object as the CTE. Potentially interfering edges intersect an interference or keep away zone defined by the CTE, described below. The system screens the identified potentially interfering edges for interfering edges, which present a significant risk of interference (step 110). Interfering edges are edges of objects that are a significantly different color than the trap color of the trap polygon. Methods for locating interfering edges are described in greater detail in co-pending application entitled "Trap Shaping", filed Jan. 29, 1999, assigned Ser. No. 09/240,946, the contents of which are expressly incorporated herein by reference.

The system forms a trap polygon to avoid any interfering edges using a base trap width (step 115). The base trap width can be user-selectable or predetermined. The base trap width defines the distance the trap polygon will extend away from the CTE. Thus, the trap polygon is generally as wide as the base trap width.

Figure 2:
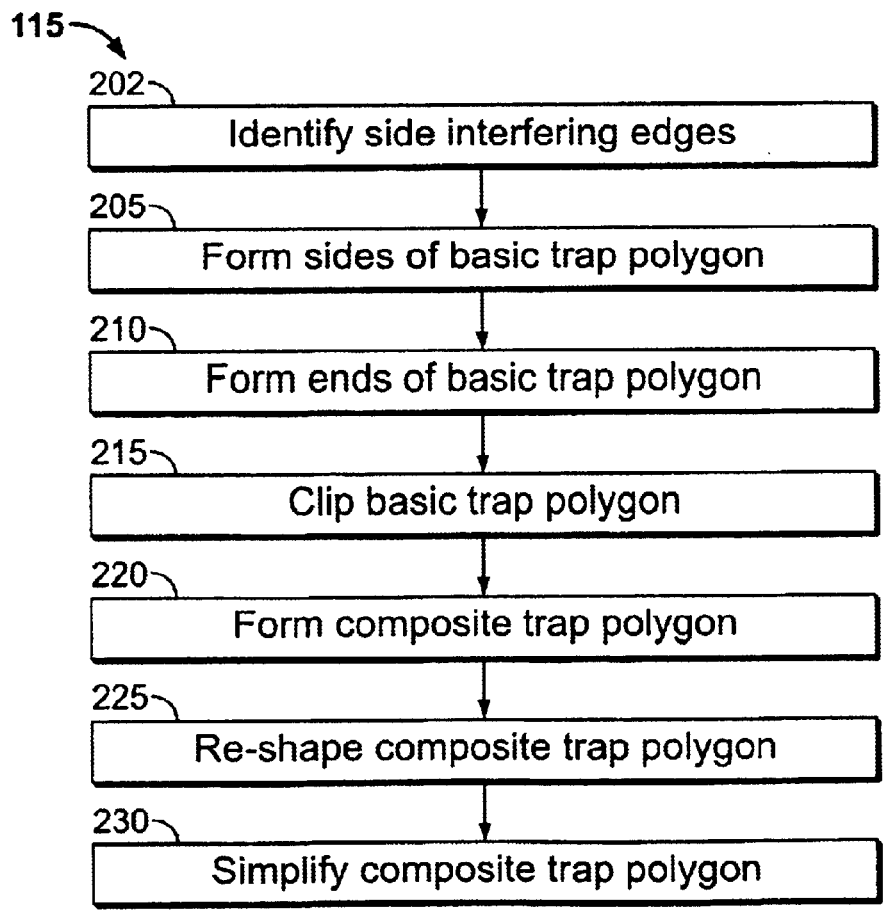
FIG. 2 is a flowchart for forming a trap polygon.

FIG. 2 is a flowchart for forming a trap polygon (step 115 in FIG. 1). The trap polygon includes a plurality of points and segments connecting consecutive points so that each point has two segments which have that point as an endpoint. The trap polygon includes a point for each endpoint of the CTE. As the system adds points to the trap polygon, the system records a type for the point (i.e., why the point was added). As noted above, the segments of the trap polygon which share an endpoint with the CTE are sides of the trap polygon.

The system identifiers side interfering edges which are close enough to an endpoint of the CTE to influence the shape of a side of the trap polygon for the CTE (step 202). If the CTE is shorter than a predetermined length, such as one pixel, the system identifies interfering edges which have an endpoint that coincides with an endpoint of the CTE as side interfering edges. Otherwise, the system identifies interfering edges which have an endpoint within a predetermined distance, such as half a pixel, of an endpoint of the CTE as side interfering edges. This predetermined distance and length can be user-selectable values.

The system forms sides of a basic trap polygon according to the trap width and the identified side interfering edges, as described below (step 205). The system forms the sides so that when a neighboring trap polygon is formed and adjusted, the corresponding side of that neighboring trap polygon will coincide with the appropriate side of the current trap polygon. After forming the sides, the system forms the ends of basic trap polygon, such as by recording segments connecting the endpoints of the sides (step 210).

The system forms the sides of the basic trap polygon to avoid any identified side interfering edges. An interfering edge which has colors within a vignette color transition does not affect the formation of the sides. If the system does not identify any side interfering edges, the system forms sides which are equal in length to the corresponding trap width and form right angles with the CTE at the corresponding endpoint.

If more than two side interfering edges correspond to an endpoint of the CTE, the system uses two of those side interfering edges to form the sides at that endpoints of the CTE. In one implementation, the system uses the two side interfering edges which form the smallest angle with each side of the CTE, respectively. For example, if the CTE shares an endpoint with three interfering edges, the interfering edge between the other two interfering edges is not used in forming the sides of the trap polygon.

Methods for forming a side of a trap polygon are described in greater detail in "Trap Shaping".

After forming the sides and ends defining the basic trap polygon in steps 205 and 210, the system clips and self-intersecting sections from the basic trap polygon (step 215). That is, the system clips portions of the trap polygon as appropriate so that the basic trap polygon is a single enclosed polygon encompassing the CTE without overlapping sides. Methods for clipping trap polygons are described in greater detail in "Trap Shaping".

After clipping any closed sections, the system forms a composite trap polygon by trimming the basic trap polygon (step 220). More specifically, the system trims sections of the trap polygon which intersect with interfering edges. Methods for trimming trap polygons are described in greater detail in "Trap Shaping". Thereafter the system re-shapes the composite trap polygon to avoid interfering edges and trap polygons corresponding to those interfering edges (step 225).

To re-shape the composite trap polygon, the system adds points to the composite trap polygon, recording the condition causing each point to be added (i.e., the type of each point) for reference in re-shaping in the later stages of the shaping process. The system contracts the composite trap polygon by moving the points of the composite trap polygon according to the types of the points, as described below. The system optionally simplifies the contracted polygon by removing any adjacent colinear points in the composite trap polygon (step 230). The system removes a point which is colinear with the endpoints of segments which share the point as an endpoint.

Figure 3:
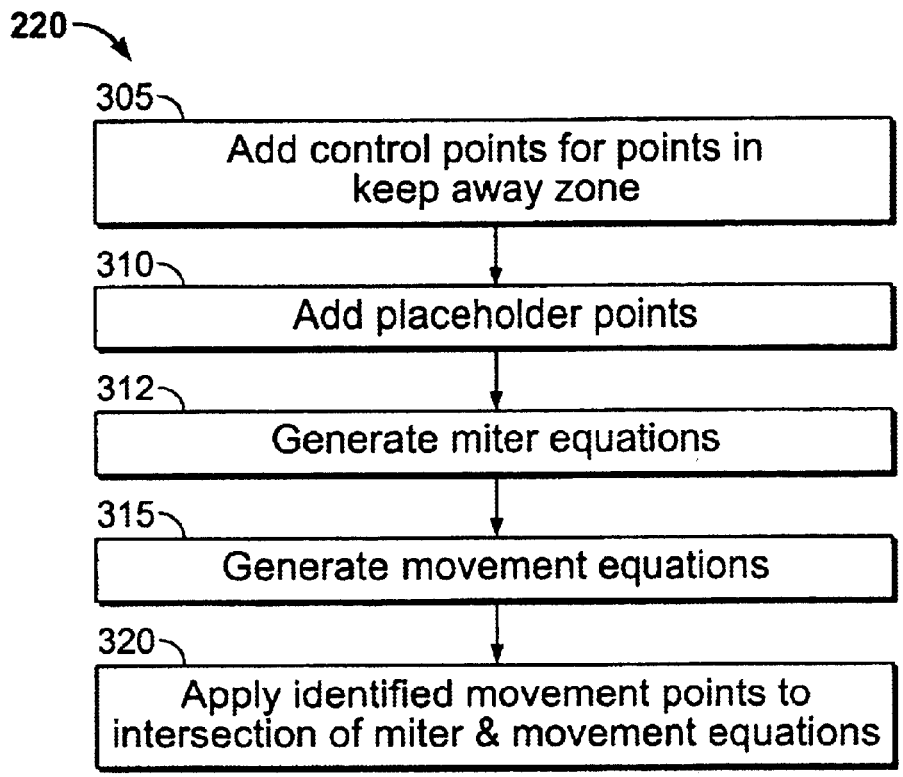
FIG. 3 is a flowchart for contracting a trap polygon.

FIG. 3 is a flowchart for re-shaping the composite trap polygon formed in step 220 (step 225 in FIG. 2). FIGS. 4A–4D illustrate an example of applying the steps of FIG. 3 to a composite trap polygon 1000.

Figure 4A:
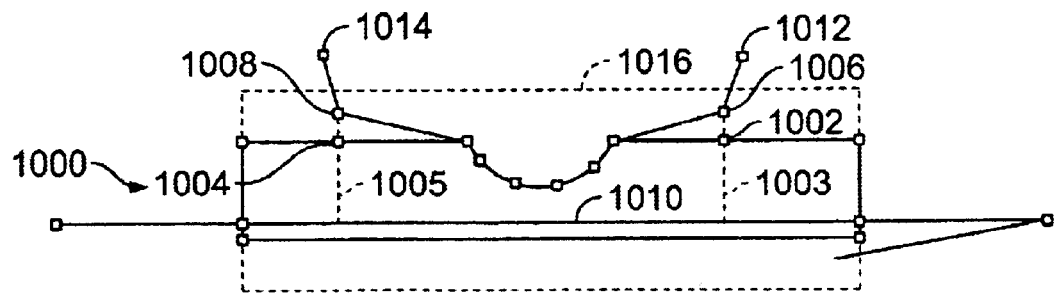
FIGS. 4A–4G illustrate an example of applying the steps of the process of FIG. 3 to a trap polygon.

The system adds control points to the composite trap polygon for endpoints of interfering edges where the endpoints are outside the composite trap polygon and inside the keep away zone (step 305). A control point for an endpoint is added to a segment of the composite trap polygon where a path traced from the endpoint to the nearest point on the CTE intersects the segment. In FIG. 4A, control points 1002 and 1004 are added to composite trap polygon 1000 for endpoints 1006 and 1008, respectively. Dashed lines 1003 and 1005 represent a path traced to a CTE 1010 to position control points 1002 and 1004 on composite trap polygon 1000. Control points are not added for endpoints 1012 and 1014 because these endpoints 1012 and 1014 are outside a keep away zone 1016 for the CTE 1010.

The system adds placeholder points to segments of the composite trap polygon between points of the composite trap polygon, including control points, which are separated by a predetermined distance (step 310). The system does not add place holder points to the sides of the composite trap polygon. The distance from comparison can be based on the trap width for the corresponding side of the CTE. The system compares the length of each segment between points on the composite trap polygon to the appropriate trap width. If the segment has a length greater than the trap width, the system adds a placeholder point to the middle of the segment or at a distance equal to the trap width from the endpoint closer to an endpoint of the CTE. However, if the segment has a length greater than twice the trap width, the system adds two placeholder points to the segment, each at a distance equal to the trap width from a respective endpoint of the segment. The system can use different multiples of the trap width for comparison and placement (e.g., one half of the trap width).

Figure 4B:
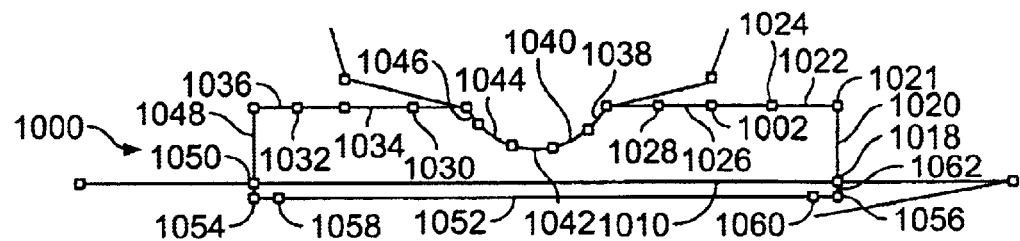

In FIG. 4B, proceeding counter-clockwise around the composite trap polygon from endpoint 1018 of CTE 1010, the system does not add placeholder points to the segment 1020 between points 1018 and 1021 because segment 1020 is a side of composite trap polygon 1000. The system compares a segment 1022 between points 1021 and 1002 to the trap width corresponding to the appropriate side of CTE 1010 (the distances shown in FIG. 4B are exemplary and not necessarily to scale). Assuming the length of segment 1022 is more than the trap width but less than twice the trap width, a placeholder point 1024 is added to segment 1022 at a distance equal to the trap width from point 1021 (the endpoint of segment 1022 closest to an endpoint of CTE 1010). Similarly, for segment 1026, the system adds a placeholder point 1028. The system adds placeholder points 1030 and 1032 to segments 1034 and 1036, respectively. The system does not add placeholder points to segments 1038, 1040, 1042, 1044, and 1046 because these segments are not longer than the corresponding trap width (the trap width corresponding to the side of CTE 1010 where these segments are located). The system does not add placeholder points to segments 1048 and 1050 because these segments are sides of composite trap polygon 1000. Assuming the length of segment 1052 between points 1054 and 1056 is more than twice the trap width for the corresponding side of CTE 1010, the system adds two placeholder points 1058 and 1060 to segment 1052. The system adds placeholder points 1058 and 1060 at distances equal to the appropriate trap width from the points 1054 and 1056, respectively. The system does not add a placeholder point to segment 1062 because segment 1062 is a side of composite trap polygon 1000.

After adding the placeholder points to the composite trap polygon, the system generates a miter equation for each point on the composite trap poly. (312). Each miter equation defines a line on which traps from the CTE and an interfering edge would optimally abut one another. More specifically, a miter equation defines the line that splits the distance between the interfering edge and the CTE for which the current trap is being generated. By locating the miter line half way between the CTE and the interfering edge, consistent shaping information can be generated to produce traps for both edges. The shaping information (miter line) can be recreated when the position or function of the two edges (i.e., when trapping the interfering edge in view of the CTE) is reversed. Miter equations are calculated such that the keep away movements caused by the interfering edge (edge A) on the CTE (edge B) trap polygon are located in the same (or within a predetermined distance) location as when the edge A is processed as the CTE and edge B is the interfering edge. In one implementation, the system generates a miter equation for each point on the composite trap polygon using the feature closest to the point.

If the CTE and the interfering edge are parallel, then the miter equation defines a line that is equidistant from each (in the same plane). If, however, the CTE and the interfering edge are parallel and share an endpoint, then the miter equation can be defined as a line that is perpendicular to the CTE (and the interfering edge) and that passes through the shared endpoint. In one implementation, if the CTE and interfering edge are parallel and if the two edges have endpoints that are within a predetermined distance, then the miter equation can be defined as a line that is perpendicular to the CTE (and the interfering edge) and that passes through one of the adjoining endpoints. In one implementations, the predetermined distance is one half a pixel.

The system also generates a movement equation for each of the points in the composite trap polygon according to the type of the point (step 315). In one implementation, the movement equations can be of the form of a line that includes the composite polygon point and a corresponding closest point on the CTE. In another implementation, the movement equations can be of the form of vectors. Different movement equations can be generated for points which have been added to the trap polygon for different reasons. In one implementation, the movement equations are calculated before the miter equation.

Some points do not move. In one implementation, if the distance between a point and the closest point on the nearest interfering edge is greater than a predetermined keep away threshold, such as the trap width, the system does not create a movement equation for the point. In one implementation, movement equations are calculated for all points that are less than the trap width away from the closest point on the nearest feature. In one implementation, the system also does not create a movement equation for the endpoints of the CTE.

For other points, the system determines a direction (and in one implementation a length) for a movement equation for each point. For a point which lies outside the endpoints of the CTE, the system generates a movement equation that is directed toward the closest endpoint of the CTE. For a point which lies (when viewed with the CTE oriented horizontally on a page) inside the endpoints of the CTE (having a horizontal position that falls between the endpoints), the system generates a movement equation that is directed toward the closest point on the CTE (defining a perpendicular line).

In one implementation, the system determines a distance (length) for each movement equation using a predetermined distance that spans at least half the distance between the CTE and the interfering edge along the movement equation. Alternatively, the movement equation can include no distance (length) information.

After generating appropriate miter and movement equations, the system moves all identified movement points (those points having movement equations) to the intersection of a respective movement equation and miter equation, shaping the composite trap polygon (step 320). In one implementation, a point will not be moved if its proposed final point (intersection of miter equation and movement equation) is farther away from the CTE than the point currently is located. In one implementation, after all of the point moves have been realized, the system may add points along the miter equation at the trap width between a point that was moved and one that was not. These additional points are used to maintain a clean miter and consistent trap width between where the moved points ends up, and the next point along the composite polygon. In addition, where a bowtie is removed in the trimming operation of side of the trap polygon may remain that has only one point. If the single side point is moved to an intersection point of the miter equation, then two additional points may be added along the miter equation at its intersection points with the movement equation between the unmoved point (created by removing the bowtie) and the two endpoints of the CTE.

Figure 4C:
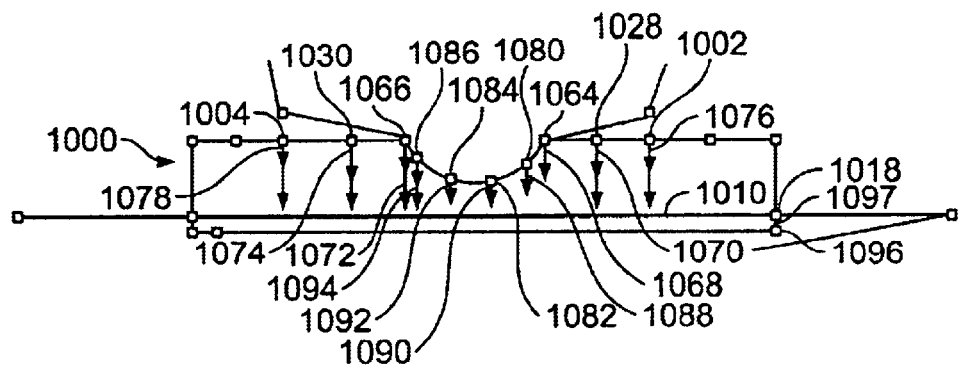
Figure 4D:
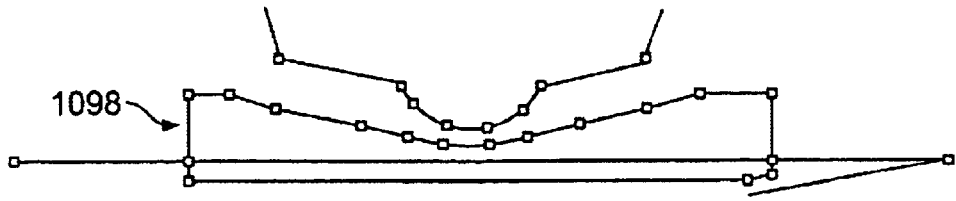

Referring now to FIG. 4C, in the example shown, the system generates a first movement equation 1078 for control point 1004. The system adds a second movement equation 1074, corresponding to the movement for placeholder point 1030. The system adds movement equation 1072 corresponding to the movement for point 1066. Trimming points 1080, 1082, 1084, and 1086 have movement equations 1088, 1090, 1092, and 1094, respectively. The system generates movement equation 1068 for point 1064, movement equation 1070 for placeholder point 1028 and movement vector 1076 for control point 1004. Point 1096 in the corner of composite trap polygon 1000 has movement equation 1097 to move point 1096 toward endpoint 1018 of CTE 1010. The remaining points do not move. FIG. 4D shows the resulting contracted trap polygon 1098 after moving the appropriate points to the intersection of the miter equation and the respective movement equations.

Figure 4E:
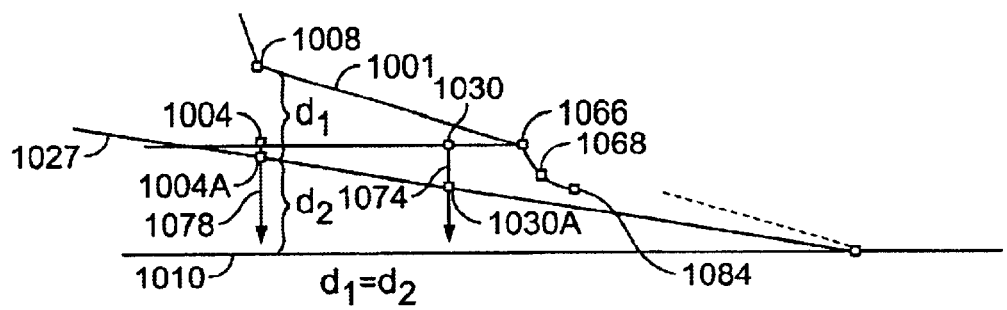

FIG. 4E shows an exploded view of a portion of the trap region 1000. More specifically, a miter equation 1027 associated with interfering edge portion 1001 (with endpoints 1008 and 1066) is shown. Movement equations 1078 associated with point 1004 and 1074 associated with point 1030 are also shown. In accordance with the movement step (step 320 of FIG. 3), points 1004 and point 1030 are moved to the intersection of their respective miter (here miter equation 1027) and movement equations (movement equations 1078 and 1074, respectively), resulting in movement of the points to positions marked as 1004$a$ and 1030$a$, respectively. The distances d1 and d2 are equal, ensuring when a trap is shaped for edge 1001 with respect to interfering edge 1010, the resultant trap will abut the miter equation 1027, and necessarily newly formed trap region 1000.

As described above, the miter equation for a given point on the trap polygon is calculated with reference to the closest point on the closest feature in the keep away zone the point. In one implementation, an additional check is added in the process prior to moving any point on the trap polygon. This test is done on an individual basis as the points are processed. The system checks to determine if the movement of the point to the intersection of the calculated miter equation and the movement equation will result in the point being too close to the CTE. In one implementation, a point is too close if its proposed new location is less than half of the distance between the CTE and the closest point on the closest feature that resides in the keep away zone. Alternatively (or in addition), a point can be determined to be too close if its proposed new location is less than half of the distance between the CTE and the closest point on the feature being considered. If the point is too close, then the system locates an optimal intersection point (an intersection of a miter equation associated with a feature in the keep away zone and the movement equation) whose distance to its associated feature is smallest and moves the point to that optimal intersection point.

Figure 4F:
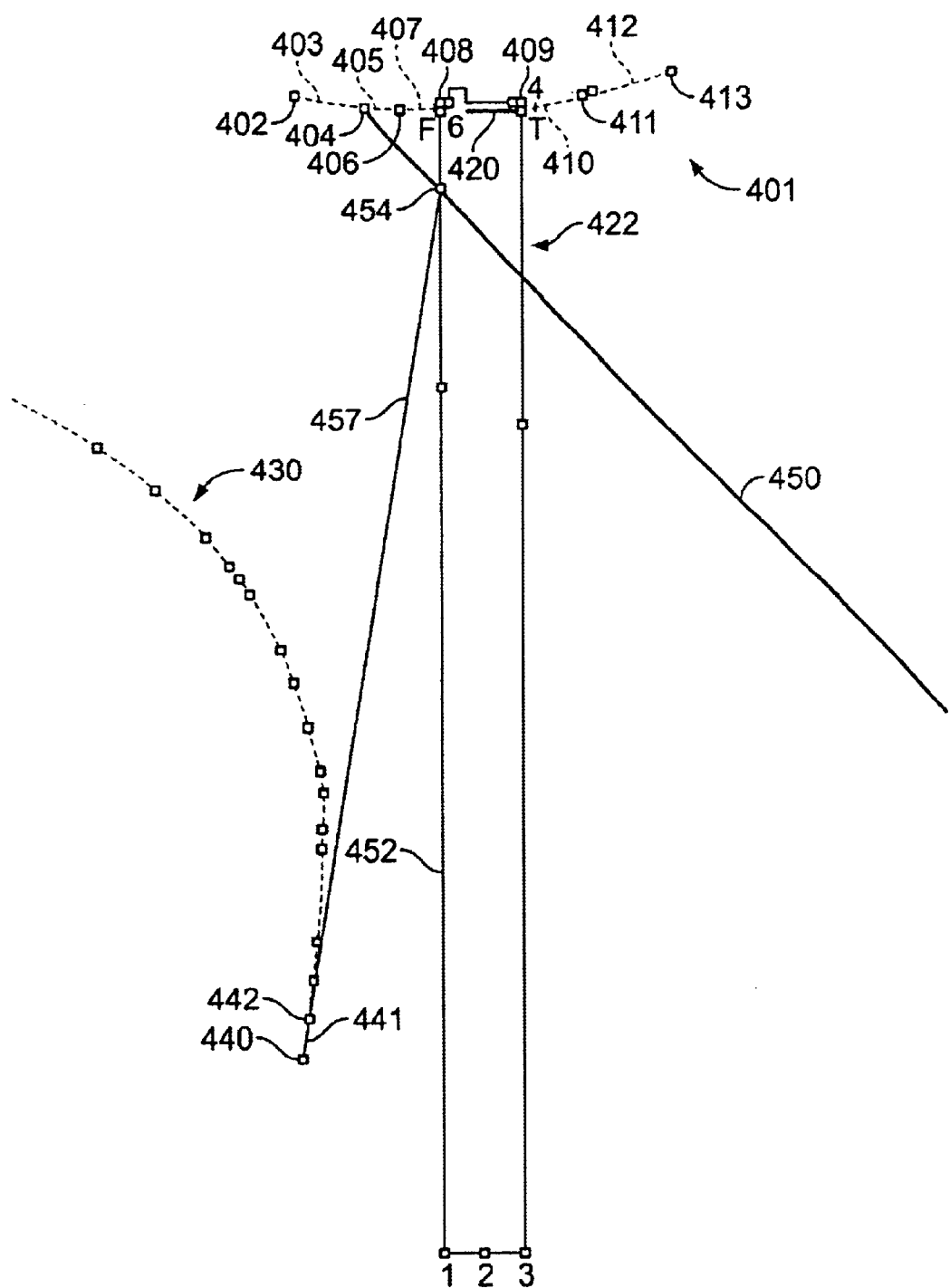
Figure 4G:
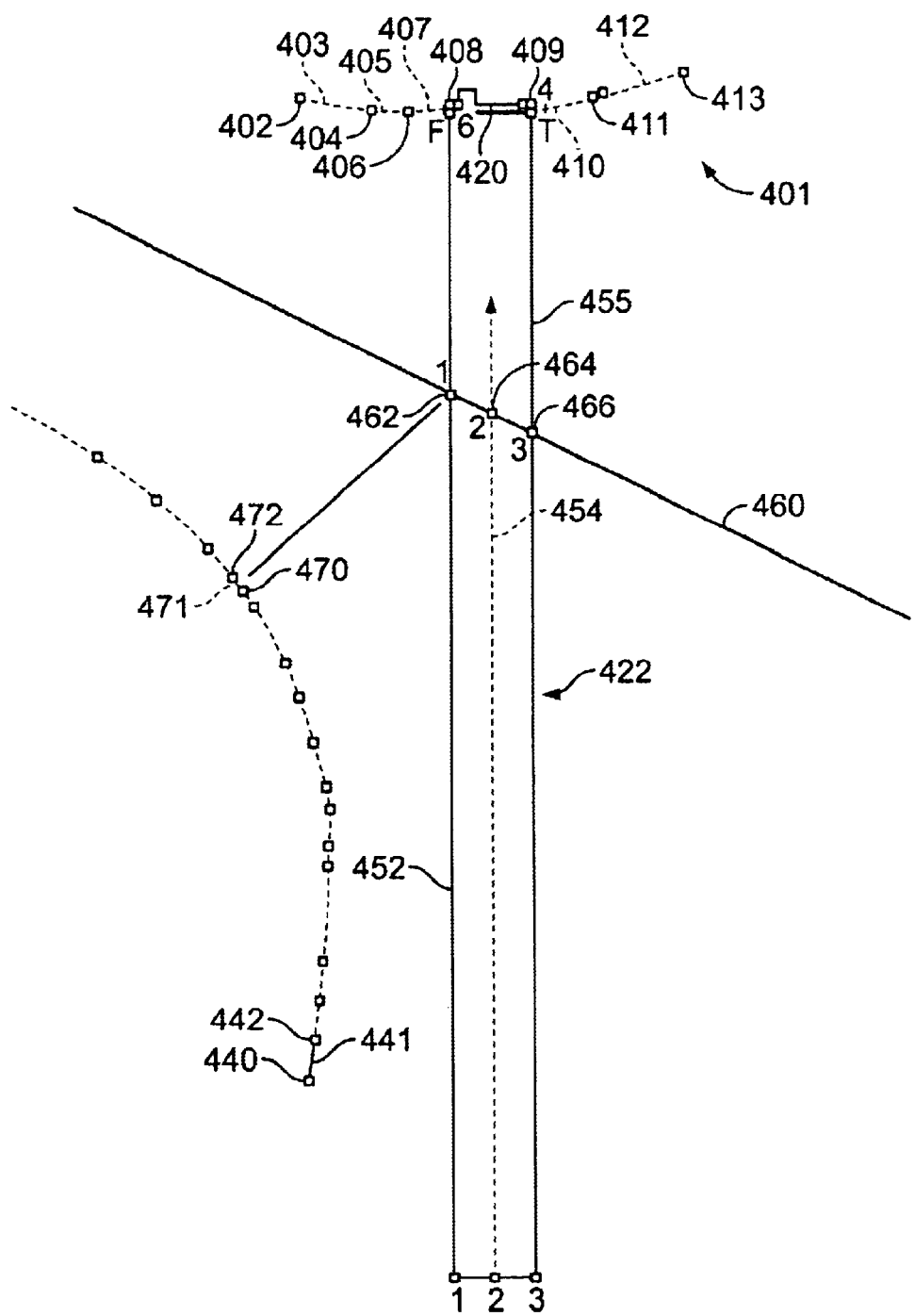

This additional check may be more easily understood with reference to FIGS. 4F and 4G. FIG. 4F shows a CTE 420 and an associated trap polygon 422. CTE 420 is part of an arc 401 that includes plural edges including edge 403 (between points 402 and 404), edge 405 (between points 404 and 406), edge 407 (between points 406 and 408), edge 420 (the CTE between points 408 and 409), edge 410 (between points 409 and 411) and edge 412 (between points 411 and 413). Trap polygon 422 includes points 1, 2, 3, 4 and 6. Also shown is an arc 430 that is in close proximity to arc 401. Arc 430 includes plural segments (edges) all of which shown lie within the keep away zone for CTE 420. The closest edge to point 1 on the trap polygon is edge 411 (between points 440 and 442). Also shown is a miter equation 450 calculated for all points on edge 441. The movement equation 452 for point 1 follows along the trap polygon side (that spans between point 1 and point 6). The intersection of the movement equation 452 and the mite equation 450 is shown at point 454. Using the approach of FIG. 3, when re-shaping the trap polygon 422, point 1 would move to the intersection point 454 on line 457. This may produce undesirable results. As such, the additional check can be performed to determine if the movement of the point will result in the point being located too closely to the CTE. Here, that condition is met.

FIG. 4G shows the results after locating the optimal intersection point (the intersection point that is closest to its associated feature). The intersection point 462 corresponds to the intersection of miter equation 460 (associated with all points on edge 471 between points 470 and 472) and movement equation 452. Accordingly, point 1 is moved to intersection point 462. Point 462 is farther away from the CTE 420, but is the closest intersection point for all points on interfering edges located in the keep away zone. Thereafter, the process can continue for all other points in the trap polygon (points 2, 3, 4 and 6) resulting in the movement of points 2 and 3 to the intersection points 464 and 466, respectively (where points 464 and 466 are the intersection of movement equations 454 and 456, respectively, with miter equation 460).

Figure 5:
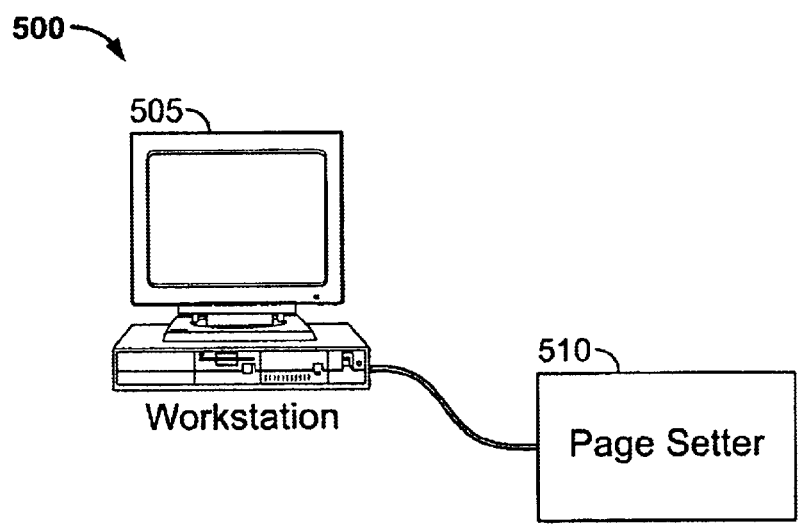
FIG. 5 shows a computer system including a computer connected to a printer.

FIG. 5 shows a computer system 500 for performing the technique described above. A computer 505 is connected to an imaging device, such as a page setter 510. Computer 505 executes a process to form a trap polygon for each CTE in an electronic document stored in computer 505. After forming the trap polygons, computer 505 sends the electronic document with the trap polygon to page setter 510.

The invention can be implemented in digital electronic circuitry, or in computer hardware, firmware, software, or in combination of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

In one implementation, such as that shown in FIG. 5, a computer system includes a processor, a random access memory (RAM), a program memory (for example, a writable read-only memory (ROM) such as a flash ROM), a hard drive controller, a video controller, and an input/output (I/O) controller coupled by a processor (CPU) bus. The system can be preprogrammed, in ROM, for example, or it can be programmed (and reprogrammed by loading a program from another source (for example, from a floppy disk, a CD-ROM, or another computer). The hard drive controller is coupled to a hard disk suitable for storing executable computer programs, including programs embodying the present invention, and data including. The video controller is coupled to a video recorder, which can be used for storing and importing video footage and for writing final output.

The I/O controller is coupled by means of an I/O bus to an I/O interface. The I/O interface receives and transmits data (e.g., stills, pictures, movies, and animations for importing into a composition) in analog or digital form over communication links such as a serial link, local area network, wireless link, and parallel link. Also coupled to the I/O bus is a display and a keyboard. Alternatively, separate connections (separate buses) can be used for the I/O interface, display and keyboard.

Numerous implementations of the invention have been described. However, additional variations are possible. For example, the sequence of non-order dependent steps can be different. The technique can be performed as one or more processes executing on one or more processors in a local or distributed system. Each trap polygon in a page can be formed independently or in parallel with other trap polygons. The technique can be applied to a bitmap space as well. The trap width can be set in various ways, such as user selection. A user selectable keep away zone parameter determines the multiple of the trap width for the width of the keep away zone. Each side of the keep away zone can have a corresponding parameter or a single parameter can be used for the entire zone to determine the zone width. The process can be applied to a page on a tile by tile basis.

What is claimed is:

1. A method of forming a trap polygon for trapping a color transition edge, where the trap polygon has an associated trap color determined by colors defining the color transition edge, the method comprising:

identifying an interfering edge which intersects a keep away zone defined by the color transition edge; and forming a trap polygon for trapping the color transition edge including shaping the trap polygon to avoid overlapping a trap polygon corresponding to the interfering edge, wherein shaping the trap polygon includes determining a miter equation that defines a line that is half a distance from the color transition edge and the interfering edge along a length of either edge;

determining movement equations for movement points, the movement points being points on the trap polygon that need to move due to the proximity of the interfering edge; and moving each movement point to an intersection of a movement equation and the miter equation.

2. The method of claim 1, where the trap polygon, the color transition edge, and interfering edge are vector-based representations.

3. The method of claim 1, where the keep away zone encloses the trap polygon.

4. The method of claim 1, where the keep away zone is within a tile, where the tile includes one or more tile edges and each potentially interfering edge is a tile edge which touches the keep away zone.

5. The method of claim 4, where an interfering edge has a paper color on one side.

6. The method of claim 4, where the color transition edge is defined by two points and defines a transition between a first color and a second color, and the first color is one a same side of the color transition edge as an interfering edge and the second color is on an opposite side of the color transition edge form the interfering edge, and where the interfering edge has a color on one side which would satisfy a trap condition with the first color.

7. The method of claim 4, where the color transition edge is defined by two points and defines a transition between a first color and a second color, and the first color is on a same side of the color transition edge as an interfering edge and the second color is on an opposite side of the color transition edge from the interfering edge, where the interfering edge has an interfering color on one side which would satisfy a trap condition with the second color, and the interfering color and the second color indicate a hypothetical trap color which is significantly different from the trap color.

8. The method of claim 7, where the hypothetical trap color differs from the trap color by more than a vignette color transition.

9. The method of claim 8, where the vignette color transition is approximately 5%.

10. The method of claim 8, where the trap color has one or more trap colorant planes and the hypothetical trap color has one or more hypothetical color planes, and any trap colorant plane which would not overpoint differs from a corresponding hypothetical colorant plane by more than the vignette color transition, where a colorant plane which would overprint would not be printed when printing an object having a color including that colorant plane.

11. The method of claim 1, where forming the trap polygon includes:

shaping one or more edges of the trap polygon so that the trap polygon abuts without overlapping any abutting trap polygon based upon an interfering edge which intersects the color transition edge, and so that the trap polygon does not overlap any object edge which is within the keep away zone but does not intersect the color transition edge or any close trap polygon based upon an interfering edge which is within the keep away zone but does not intersect the color transition edge.

12. The method of claim 1, where trimming the trap polygon includes:

adjusting the trap polygon to avoid one or more interfering edges by adding trimming points to the trap polygon for points on any interfering edges which are in or on the trap polygon; and removing points from the trap polygon which are outside the trimming points.

13. The method of claim 1, where the trap polygon is defined by a plurality of points which are of one or more types, and wherein shaping the trap polygon includes moving one or more points of the trap polygon according to the type of the point.

14. The method of claim 1, wherein the miter equation defines a line that splits a distance between the color transition edge and the interfering edge.

15. The method of claim 1, wherein if the color transition edge and the interfering edge are parallel and share an end point, the step of determining a miter line includes locating the miter line as a line that is perpendicular to the color transition edge and including the end point.

16. The method of claim 1, wherein if the color transition edge and the interfering edge are parallel and have end points that are within a predetermined distance, the step of determining a miter line includes a locating the miter line as a line that is perpendicular to the color transition edge and includes one of the end points.

17. The method of claim 16, wherein the predetermined distance is half a pixel.

18. The method of claim 1, wherein the movement equations have a direction and a length that is at least half a distance from the color transition edge to the interfering edge.

19. The method of claim 1, wherein the step of determining movement equations includes:

in a first coordinate space, determining if a point is between the end points that define the color transition edge, if so, locating a movement equation that passes through the point and is perpendicular to the color transition edge.

20. The method of claim 19, wherein if the point is outside the end points, locating a movement equation that passes through the point and a closest end point on the color transition edge.

21. The method of claim 1, wherein the movement equations are movement vectors that have a direction and a length.

22. The method of claim 21, wherein the movement vectors length is at least half a distance between the color transition edge and the interfering edge along the entire length of both edges.

23. A method of adjusting a trap polygon for trapping an edge in view of an identified interfering edge, the method comprising the steps of:

determining a miter equation that is half a distance from the color transition edge and the interfering edge along the length of either edge;

determining movement equations for movement points, the movement points being points on the trap polygon that need to move due to the proximity of the interfering edge; and moving each movement point to an intersection of a movement equation and the miter equation.

24. A method comprising:

sequentially forming trap polygons for color transition edges in a sequence of color transition edges in a digital document, each trap polygon in sequence having its final form before any subsequent polygon is formed, wherein the trap polygons are non-overlapping, and wherein forming the trap polygon for each given color transition edge in the sequence comprises:

identifying as an interfering edge each color transition edge which intersects a keep away zone defined by the given color transition edge;

for each interfering edge calculating a line on which traps from the given color transition edge and the interfering edge would optimally abut one another; and shaping the trap polygon using each line, such that the trap polygon for the given color transition edge does not intersect any of the lines.

25. A computer program for forming a trap polygon for trapping a color transition edge, where the trap polygon has an associated trap color determined by colors defining the color transition edge, the computer program tangibly stored on a medium, including instructions operable to cause a computer to:

identifying an interfering edge which intersects a keep away zone defined by the color transition edge; and form a trap polygon for trapping the color transition edge including shaping the trap polygon to avoid overlapping a trap polygon corresponding to the interfering edge, wherein shaping the trap polygon includes determining a miter equation that defines a line that is half a distance from the color transition edge and the interfering edge along a length of either edge;

determining movement equations for movement points, the movement points being points on the trap polygon that need to move due to the proximity of the interfering edge; and moving each movement point to an intersection of a movement equation and the miter equation.

26. A computer program tangibly stored on a medium, including instructions operable to cause a computer to:

sequentially form trap polygons for color transition edges in a sequence of color transition edges in a digital document, each trap polygon in sequence having its final form before any subsequent polygon is formed, wherein the trap polygons are non-overlapping, and wherein instructions to form the trap polygon for each given color transition edge in the sequence include instructions to:

identify as an interfering edge each color transition edge which intersects a keep away zone defined by the given color transition edge;

for each interfering edge calculate a line which traps from the given color transition edge and the interfering edge would optimally about one another; and shape the trap polygon using line, such that the trap polygon for the given color transition edge does not intersect any of the lines.

* * * * *

UNITED STATES PATENT AND TRADEMARK OFFICE
CERTIFICATE OF CORRECTION

PATENT NO. : 6,987,585 B1
DATED : January 17, 2006
INVENTOR(S) : Douglas R. Becker It is certified that error appears in the above-identified patent and that said Letters Patent is hereby corrected as shown below:

<u>Column 11,</u>
Line 58, delete "one" and replace with -- on --;
Line 61, delete "form" and replace with -- from --;

<u>Column 12,</u>
Line 16, delete "overpoint" and replace with -- overprint --;
Line 57, after "includes" delete "a";

<u>Column 14,</u>
Line 38, delete "edge" and insert -- edge, --;
Line 40, delete "about" and replace with -- abut --;
Line 41, after "using" insert -- each --.

Signed and Sealed this

Sixth Day of June, 2006

JON W. DUDAS
*Director of the United States Patent and Trademark Office*